(12) United States Patent
Cho et al.

(10) Patent No.: US 6,459,749 B1
(45) Date of Patent: Oct. 1, 2002

(54) MULTI-FUNCTIONAL HEAD FOR SPENT NUCLEAR FUEL ROD EXTRACTION

(75) Inventors: Myoung-Wui Cho, Daejeon-si (KR); Ji-Sup Yoon, Daejeon-si (KR)

(73) Assignees: Korea Atomic Energy Research Institution, Daejeon-Si (KR); Korea Electric Power Corporation, Seoul (KR)

( * ) Notice: Subject to any disclaimer, the term of this patent is extended or adjusted under 35 U.S.C. 154(b) by 0 days.

(21) Appl. No.: 09/517,280

(22) Filed: Mar. 2, 2000

(30) Foreign Application Priority Data

Dec. 29, 1999 (KR) .............................. 99-64621

(51) Int. Cl.$^7$ ........................ G21C 19/02; G21C 19/10; G21C 19/34
(52) U.S. Cl. ........................ 376/261; 376/260; 414/146; 294/906
(58) Field of Search .............................. 376/268, 269, 376/270, 271, 260, 261; 414/146, 745.3, 746.8; 294/906

(56) References Cited

U.S. PATENT DOCUMENTS

| | | | | |
|---|---|---|---|---|
| 4,175,318 A | * | 11/1979 | Matsuura et al. | 29/705 |
| 4,297,776 A | * | 11/1981 | Fogg | 29/252 |
| 4,374,801 A | * | 2/1983 | Albin | 376/264 |
| 4,539,174 A | * | 9/1985 | Patenaude | 376/261 |
| 4,575,305 A | * | 3/1986 | Krajicek et al. | 29/726.5 |
| 4,647,424 A | * | 3/1987 | Meuschke et al. | 376/264 |
| 4,723,359 A | * | 2/1988 | Blissell | 29/723 |
| 4,829,648 A | * | 5/1989 | Arzenti et al. | 29/890.031 |
| 4,857,262 A | * | 8/1989 | Spilker | 29/426.4 |
| 4,886,635 A | * | 12/1989 | Forster et al. | 376/268 |
| 4,903,281 A | * | 2/1990 | Matchett et al. | 376/264 |
| 4,929,413 A | * | 5/1990 | Kaufmann et al. | 376/268 |
| 5,180,540 A | * | 1/1993 | Smentek | 376/268 |
| 5,251,243 A | * | 10/1993 | Nylund et al. | 29/723 |
| 5,274,684 A | * | 12/1993 | Yoshida et al. | 376/261 |
| 5,278,879 A | * | 1/1994 | McDaniels, Jr. | 376/260 |
| 5,317,609 A | * | 5/1994 | Fichet et al. | 376/261 |
| 5,586,158 A | * | 12/1996 | Iwama et al. | 376/268 |
| 5,699,393 A | * | 12/1997 | Picard et al. | 376/261 |
| 5,748,691 A | * | 5/1998 | Harmon et al. | 219/121.64 |
| 5,825,837 A | * | 10/1998 | Peters et al. | 294/100 |
| 5,850,424 A | * | 12/1998 | Challberg et al. | 376/271 |

FOREIGN PATENT DOCUMENTS

DE              3519075 A1    *    4/1986

* cited by examiner

Primary Examiner—Charles T. Jordan
(74) Attorney, Agent, or Firm—Arent Fox Kintner Plotkin & Kahn, PLLC

(57) ABSTRACT

A fuel rod extracting machine which can extract the fuel rods one by one from a Korean type 17×17 Light Water Reactor fuel assembly comprises a multi-functional rotary head including a camera for measuring the positions of the fuel rods and securing nuts being fastened on the bottom end piece of fuel assembly, an impact wrench for unfastening the securing nuts, and a gripper for gripping and extracting the fuel rods one by one. All of these are installed on a single rotary disc, which is driven by a tool rotating motor, at intervals of 90 degrees. To improve the reliability and safety in using the multi-functional rotary head, a load cell and a remote compliance center are installed at the rear of the gripper. The load cell monitors a state of insertion of the fuel rod into a collet and measures a fuel rod extracting force. The remote compliance center provides the smooth insertion of the fuel rod onto the collet, even though there exists a small misalignment between them.

5 Claims, 4 Drawing Sheets

MULTI-FUNCTIONAL HEAD FOR SPENT NUCLEAR FUEL ROD EXTRACTION

BACKGROUND OF THE INVENTION

1. Field of the Invention

The present invention relates to a multi-functional head for extracting nuclear fuel rods from a spent nuclear fuel assembly. More specifically, the present invention relates to a multi-functional head for extracting spent nuclear fuel rods, in which the rods can be extracted one by one from a Korean type 17×17 LWR(Light Water Reactor) fuel assembly.

2. Description of the Prior Art

In order to reduce the space for the storage of the spent nuclear fuel assemblies, many countries are developing the rod consolidation technology. The rod consolidation technology is that the fuel rods are extracted from the fuel assembly as shown in FIG. 1 and are contained in separate containers so as to reduce the space for the storage. In this technology, the fuel rod extraction is required, and this is called "nuclear fuel rod extracting technique". The nuclear fuel rod extracting equipment has been developed by NUS company and B&W company of the United States, and by GNS company of Germany, but it has not been developed in Korea.

The rod extracting equipment consists of the following two functional devices. That is, one of them is a separating device for separating a top end piece(top nozzle) or a bottom end piece(bottom nozzle), and another is a puller for pulling and extracting the nuclear fuel rods by holding the exposed top portion or the bottom portion of the rods after removing top or bottom end pieces.

The top end piece or the bottom end piece is attached in different manners depending on the manufacturing companies.

That is, in one method, the top (or bottom) end piece is welded to a plurality of guide thimbles, while in another method, the top (or bottom) end piece is fastened to a plurality of guide thimbles by means of bolts. In the ones which have been manufactured in foreign countries, it is mostly welded, while in the ones manufactured in Korea, it is bolt-fastened.

In separating the top (or bottom) end piece from the nuclear fuel rod assembly, NUS company of the United States adopts a method in which a plurality of thimbles are simultaneously cut off by inserting a cutting saw into between the top (or bottom) end piece and the end of the nuclear fuel rods. B&W company of the United States and GNS company of Germany adopt a method in which the thimbles are cut one by one by inserting an internal tube cutter into the thimble as deeply as required. Cutting process has inherently a risk of a fire accident, and it produces a lot of debris and/or dust which contaminates the facility. Accordingly, in the present invention, the bolt unfastening method is adopted which is applicable to the Korean type 17×17 LWR(Light Water Reactor) fuel assembly.

In the case of the puller for extracting the fuel rods after removing the top (or bottom) end piece, NUS company of the United States and GNS company of Germany developed a multiple rods puller in which one row of fuel rods can be extracted simultaneously. Meanwhile, B&W company of the United States developed a single rod puller in which one rod is pulled at each time. In the multiple rods puller, the working time can be shortened very much. But if there are damaged rods in one row, not only the whole row of the rods may not be extracted, but also the additional damages may be inflicted to the rods. In contrast to this, in the single rod puller, the working time is extended, but a safe extraction is realized.

When using the fuel rod puller, the center of the gripper has to be exactly matched with that of the end of the fuel rod. If the gripper advances with the centers misaligned, the gripper is collided with the fuel rod resulting in damage of the fuel rod. Accordingly, before extracting the fuel rods, the coordinates of the centers of all the fuel rods are memorized into a control system, and the gripper is made to advance with the memorized coordinate values, thereby extracting the fuel rods. The coordinates of the centers of the rods are obtained from the design data which has been used for manufacturing the fuel assembly.

Before the burnup, the fuel assembly is manufactured based on the design, and therefore, the ends of all the 17×17 fuel rods have exact coordinate values. However, during the burnup of the fuel assembly, the fuel rods can be deformed, and their actual coordinate values may be different from the designed values, resulting in the collision of the gripper with the fuel rods during the extraction of the rods.

In this case, the extracting operation is terminated, and the operator manually carries out fine adjustments of the gripper while watching a CCTV, to match the center of the gripper with that of the fuel rod. However, the fine adjustment cannot be easily carried out due to the limited CCTV information. Therefore, the work efficiency is drastically lowered, and the safety is jeopardized.

SUMMARY OF THE INVENTION

The present invention is intended to solve the above-described disadvantages of the conventional techniques.

Therefore, it is an object of the present invention to provide a multi-functional head for extracting spent nuclear fuel rods, in which a bolt unfastening function for separating the top (or bottom) end piece, a single rod extracting function, and a localizing function of the fuel rods and the bolts for locating a gripper and a bolt unfastening tool at exact positions.

The apparatus of the present invention is useful for an efficient management of the spent nuclear fuel. In Korea, the electric generation by the nuclear power plants occupies more than 40% of the total electric generation. Therefore, large amounts of spent nuclear fuels are being accumulated. The spent nuclear fuels are temporarily stored in the respective nuclear power plants, and the reracking is being carried out due to the limit of the storage spaces, while the rod consolidation method is being considered. Further, for the peaceful utilization of the potential resources, the DUPIC (Direct Use of PWR fuel In CANDU reactor) process is being developed. In order to develop the nuclear fuel rod extracting technique which is indispensable in all the above described processes, the present inventor invented a multi-functional head for extracting spent nuclear fuel rods.

In the present invention, the head is named "a multi-functional rotary head" which consists of: a multi-functional tool part consisting of various tools, sensors and a camera; and a tool rotating part for rotating the above mentioned multi-functional tool part.

The multi-functional tool part consists of: a camera for measuring the positions of the fuel rods and the securing nuts fastened to the top (or bottom) end piece; an impact wrench for unfastening the securing nuts; and a gripper for gripping and pulling the fuel rods. All of these are disposed on the circumference of a rotary disc at intervals of 90 degrees, and the rotary disc is rotated by 90 degrees by driving the tool rotating part. The multi-functional rotary head is movable in the horizontal, lateral, and vertical directions.

The operating sequence of the multi-functional rotary head is as follows. That is, first the positions of all the securing nuts are measured by processing the image obtained by the camera.

By utilizing this position information, the rotary head is moved, so that the impact wrench of the multi-functional tool part would be fitted to the securing nut. The securing nuts are taken out by driving the impact wrench and the top(or bottom) end piece is separated out. The positions of all the fuel rods are measured by utilizing the same method adopted in bolt measurement process. By utilizing the position information, the multi-functional tool part is moved, so that a collet of the gripper can hold the fuel rod. The fuel rod is inserted into the collet, and the collet is closed to grip the end portion of the fuel rod so as to pull out the fuel rod.

To automatize this operating sequence, a means for detecting malfunctions is required.

Particularly if the fuel rod is pushed or pulled by an excessive force, the end portion of fuel rod can be broken causing the contamination of a facility. Therefore, the extraction force for pulling the fuel rods has to be necessarily measured.

Further, whether the fuel rod is accurately inserted into the collet has to be monitored. Accordingly in the present invention, the collet inserting force and a pulling force of the fuel rods are monitored by using the load cell installed at the rear of the collet.

Further, a remote compliance center(RCC) is installed at the rear of the collet, so that the collet would be smoothly inserted onto the fuel rod, even though there exists a small misalignment between the centers of the fuel rod and the collet.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

The present invention will be described as to its constitution.

First the overall constitution of the fuel rod extracting machine will be described.

Figure 1:
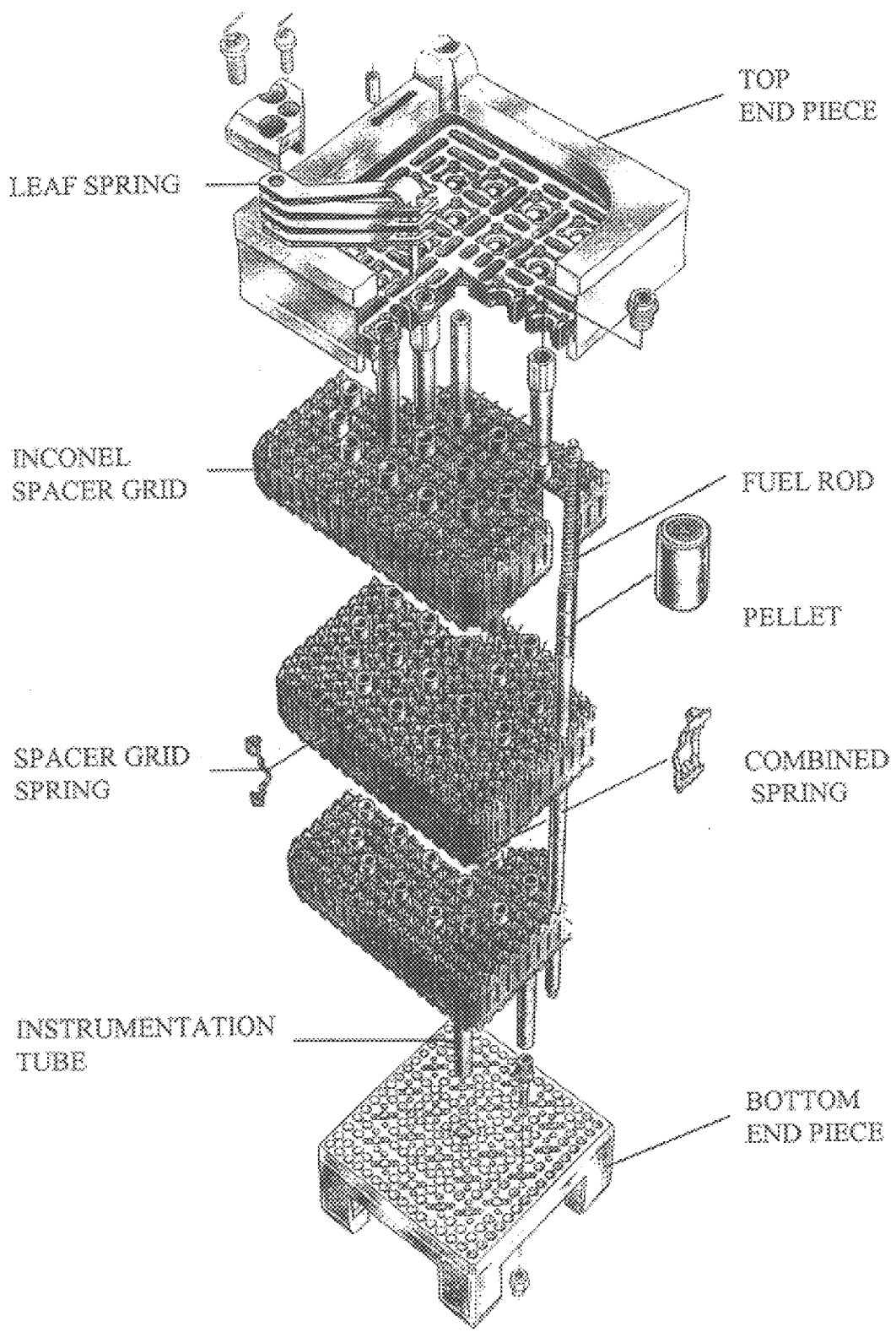
FIG. 1 illustrates the structure of the nuclear fuel assembly.
Figure 2:
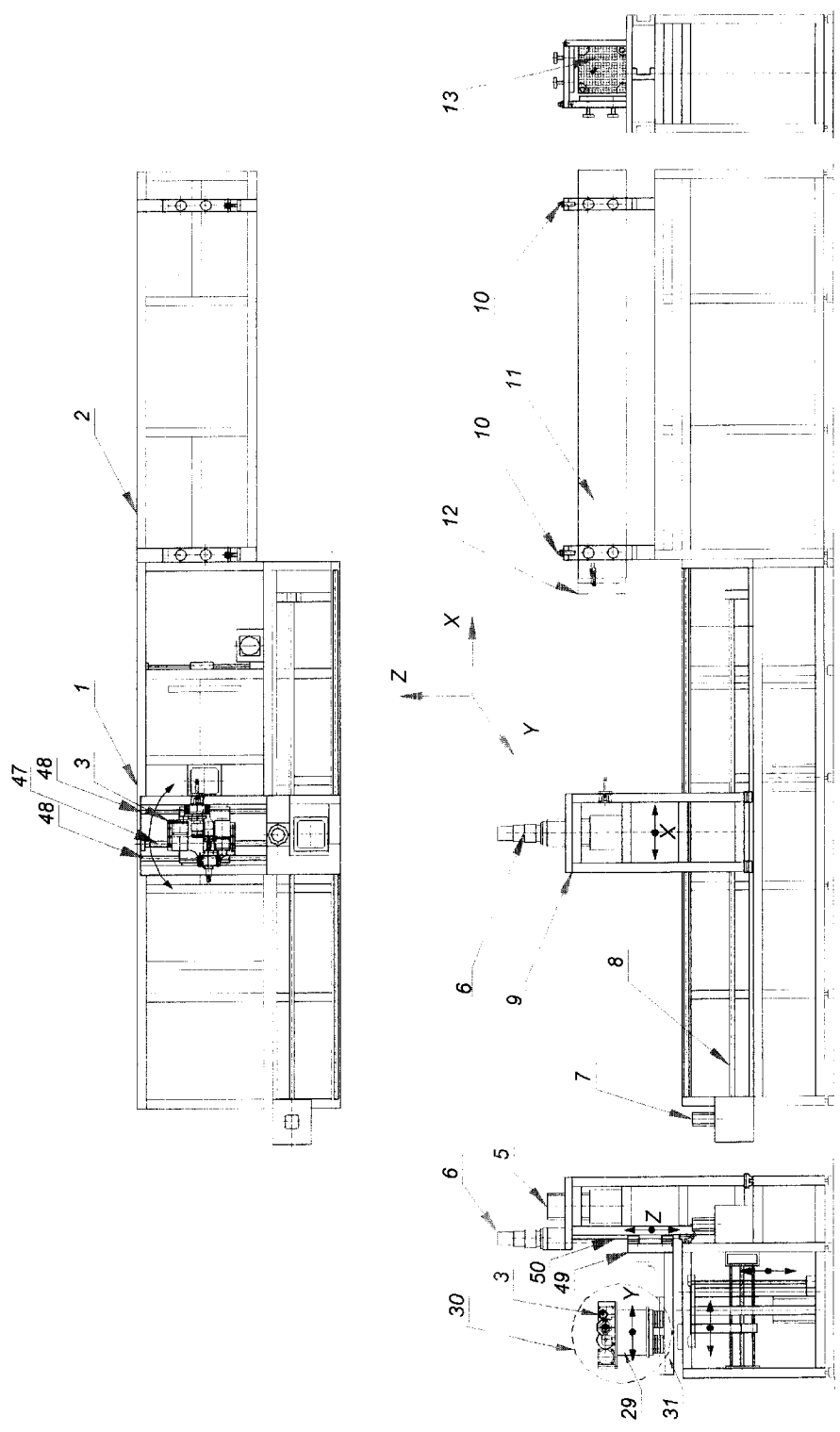
FIG. 2 is a schematic view showing the fuel rod extracting machine.

As shown in FIG. 2, the fuel rod extracting machine according to the present invention consists of: an assembly clamping table 2 for clamping the spent nuclear fuel assembly 11; and an extracting table 1 for extracting the spent nuclear fuel rods. The clamping table 2 secures the fuel assembly 11 by using the clamping device 10 installed on the top surface of the clamping table 2, so that the fuel assembly 11 would not move while pulling the rods and unfastening the securing nuts fastened to the top (or bottom) end piece 12, 13. The extracting table 1 consists of: a multi-functional rotary head 30 for carrying out the unfastening of the securing nuts, for measuring the positions, and for gripping the nuclear fuel rods; and a servo mechanism for moving the multi-functional rotary head 30 in the horizontal, lateral, and vertical directions. The servo mechanism includes a horizontal axis motor 7, a lateral axis motor 5, and a vertical axis motor 6. See FIG. 2.

Now the multi-functional rotary head 30 will be described in detail.

Figure 3:
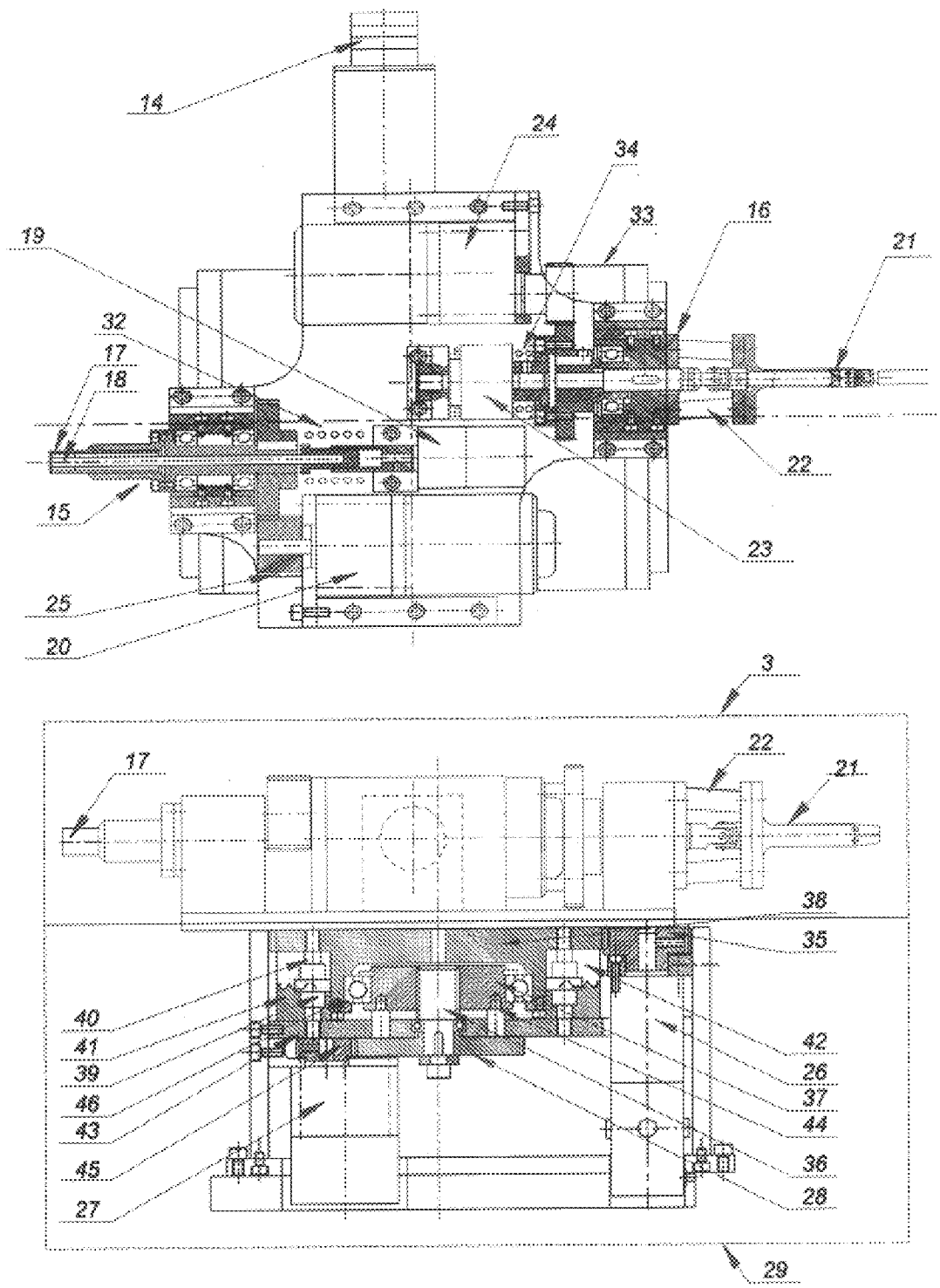
FIG. 3 is a schematic view showing the multi-functional rotary head.

As shown in FIG. 3, the multi-functional rotary head 30 which is the main feature of the present invention consists of a multi-functional tool part 3 and a tool rotating part 29. The multi-functional rotary head 30 is movable in the lateral and vertical directions by the servo mechanisms which consist of the LM(linear motion) guides, the ball screws and the lateral and vertical servo motors 5 and 6. The multi-functional rotary head 30 is mounted on the ball screw 47 and the LM guide 48 which are attached to a head mounting plate 31. The ball screw 47 is linked to the axis of the lateral axis motor 5 through the bevel gear which is not shown in FIG. 2. That is, if the lateral axis motor 5 is activated, then the rotary head 30 moves laterally while being guided by the LM guide 48. In the same way, the head mounting plate 31, on which the rotary head 30 and the lateral axis servo mechanism are mounted, is attached to a vertical mount plate 49. The vertical mount plate 49 is vertically mounted on the ball screw 50 and the LM guide which is not shown in FIG. 2 so that, by activating the vertical axis motor 6, the head mounting plate 31 moves up and down.

Further, a cradle 9, which supports the rotary head 30, the head mounting plate 31 and the vertical and lateral axes servo mechanisms, is mounted on a ball screw 8 which is rotated by an horizontal axis motor 7. Therefore, by driving the horizontal axis motor 7, the cradle 9 can transport the rotary head 30 to and from the fuel assembly 11.

Now the multi-functional tool part 3 will be described.

The multi-functional tool part 3 consists of: a camera 14 for measuring the positions of the securing nuts of the bottom end piece 12 or the top end piece 13 and the ends of the fuel rods; an impact wrench 15 for unfastening the securing nuts; and a gripper 16 for gripping the fuel rods.

Since the CCD camera is easily degraded by irradiation of the spent nuclear fuel, a tube type camera, which is radiation tolerant, is used. The image data from the camera 14 are transmitted to a computer, and are processed to identify the center positions of the fuel rods and the securing nuts by utilizing an image processing algorithm.

The impact wrench 15 is a tool for unfastening the securing nuts of the bottom end piece 12 of the fuel assembly 11, and consists of the following elements. That is, the impact wrench 15 consists of: a socket 17, a socket rotating motor 20, a reduction gear 25, a nut discharging pin 18, a nut discharging motor 19 and a coil spring 32. The cross section of the socket 17 is hexagonal, so that the securing nut can be housed. The socket 17 is rotated by the socket rotating motor 20 and the reduction gear 25. The impact wrench is designed to output a torque up to 4.5 N-m, by considering that the fastening torque of the securing nuts is about 4.0 N-m. The nut discharging pin 18 is installed inside the socket 17 which pushes out the securing nut after the bolt is separated from the bottom end piece 12. The nut discharging pin 18 performs reciprocating motion inside the socket 17 by the nut discharging motor 19.

A coil spring 32 is installed between the socket 17 and the nut discharging motor 19, to damp the contact force between the impact wrench 15 and the securing nut. That is, while inserting the socket 17 onto the nuts, if the center of the socket 17 is misaligned with that of the securing nut, an undesirable strong impact is generated causing the damage of the impact wrench 15.

The coil spring 32 is for absorbing such an impact, and also is for absorbing the unfastening stress of the impact wrench 15. That is, when the socket 17 unfastens the securing nut, the securing nut is pushed back into a socket 17. Under this condition, if the impact wrench is fixed at its position, the impact wrench is subjected to a strong stress by a pushing force of securing nuts. Therefore, by installing the spring at the rear of the impact wrench, the impact wrench can be moved back, thereby absorbing the forcible stress.

The gripper 16 is a tool for gripping the fuel rods, and consists of: a collet 21, a collet closing motor 24, a reduction gear 33, an RCC(remote compliance center) 22, a load cell 23 and a coil spring 34.

The collet 21 is a device for gripping a groove made on the end portion of the fuel rod. The collet 21 consists of two pieces of half-cut cylindrical bars. These two bars are fitted into a tube and are coupled together by using a spring installed between the ends of two bars. The spring pushes the two bars away from each other, so that it acts as an opening means of a gripper.

The other ends of the two bars on which the grooves are formed are exposed to the outside of the tube, such that the two bars are slightly spread, while the collet closing motor 24 is not activated. If the tube is moved to backward direction by the collet closing motor 24, the two bars are closed and grip the inserted fuel rod.

While inserting the gripper 16 onto the fuel rod, if the center of the collet 21 is misaligned with that of the fuel rod, an undesirable strong impact can be generated causing the damage of the fuel rod. If the fuel rod is damaged, both the fuel rod extracting machine and the facility are contaminated. Therefore, the fuel rod inserting force has to be necessarily measured to confirm whether the fuel rod is accurately inserted onto the collet 21. In the present invention, the load cell (a force measuring sensor) 23 is installed at the rear of the gripper, so that the inserting force can be monitored, Also, the fuel rod pulling force is measured by this sensor 23.

The positional accuracy of the fuel rod obtained through image processing is about 0.2 mm, which is much lower compared with the insertion tolerance (0.5 mm) of the fuel rod into the collet 21. Therefore, if the multi-functional rotary head 30 is accurately positioned based on this information, the fuel rod can be surely inserted into the collet 21. However, as described above, the damage of the fuel rod caused by inaccurate positioning of the collet 21 results in a serious problem. Therefore, in the present invention, in order to improve the reliability of the machine, a RCC (remote compliance center) 22 is installed at the rear of the collet 21. This device makes the smooth insertion between the fuel rod and the collet 21, even though there exists a small misalignment between the fuel rod and the collet 21 so that the fuel rod is not damaged by the unexpected pushing force of the collet 21. This device is widely used in the assembly process of semiconductor chips.

A coil spring 34 is installed between the collet 21 and the load cell 23 like in the impact wrench 15, thereby absorbing the excessive insertion force between the collet 21 and the fuel rod. That is, a frictions between the collet 21 and the fuel rod are alleviated during insertion so that the damages of the gripper and the fuel rod can be prevented.

Now the tool rotating part 29 will be described.

The tool rotating part 29 rotates the multi-functional tool part 3 by 90 degrees to selectively move the camera 14, the impact wrench 15 and the gripper 16 of the tool part 3 toward the fuel assembly 11, The tool rotating part 29 consists of; a rotating drive mechanism for rotating the multi-functional tool part 3; an ascending drive mechanism for moving up and down the rotating drive mechanism.

The rotating drive mechanism consists of: a rotary disc 38 supporting the multi-functional tool part 3; an upper index ring 42 attached on the rotary disc 38, and having gear teeth on the bottom thereof; and four upper clutches 40 attached on the rotary disc 38 and disposed at intervals of 90 degrees; a tool rotating motor 26 and a reduction gear 35 for rotating the rotary disc 38.

The ascending drive mechanism consists of: a nut 37 installed under the circular home of the rotary disc 38 and linked to the rotary disc 38 by a bearing 46; a screw 36 for moving the nut 37 up and down; and a reduction gear 28 for rotating the screw 36; four lower clutches 39 disposed at intervals of 90 degrees, attached on a clutch mounting plate 43; and a lower index ring 41 attached on the clutch mounting plate 43, and having gear teeth on the top thereof; a tool ascending motor 27 attached on the clutch mounting plate 43 and rotates the reduction gear 28; and four sliding pins 44 attached on the clutch mounting plate 43 and disposed at intervals of 90 degrees.

The operational principles of tool rotating part 29 will now be described.

First, as the tool ascending motor 27 is activated to rotate the reduction gear 45, the screw 36 which is attached on the reduction gear 28 is rotated, thereby lifting the nut 37. Since the nut 37 is guided by the four sliding pins 44, the nut 37 performs straight movements as the screw 36 is rotated.

When the nut 37 moves up, the rotating drive mechanism also moves up, since it is linked by the bearing 46. When the rotating drive mechanism fully ascends, the sliding pins 44 completely depart from the slots of the nut 37 so that the tool ascending motor 27 stops the driving. Under this condition, the four upper clutches 40 and the upper index ring 42 which are attached on the rotary disc 38 are completely separated from the four lower clutches 39 and the lower index ring 41, respectively which are attached on the clutch mounting plate 43.

Secondly, the tool rotating motor 26 is driven to rotate the rotary disc 38 by 90 degrees.

Then again, the tool ascending motor 27 is driven in the opposite direction to lower the nut 37 and the rotating drive mechanism. As the nut 37 descends, the threads of the upper and lower index rings 42 and 41 are mated each other. As a result, the centers of the upper and lower clutches 40 and 39, the sliding pins 44 and the slots of the nut 37 are exactly aligned.

Consequently, the rotating drive mechanism is settled on the lower clutch 39. That is, even though the tool rotating motor 26 can not be accurately controlled to rotate the rotary disc 38 by 90 degrees, the upper and lower index rings 42 and 41 guide the rotating drive mechanism to be settled at the exact position.

The multi-functional tool part 3 cannot be firmly supported by only the mating force of the threads of the upper and lower index rings 42 and 41 during the tool operation, thus, the four clutches 40 and 39 are used to additionally support the multi-functional tool part 3.

EXAMPLE

Figure 4:
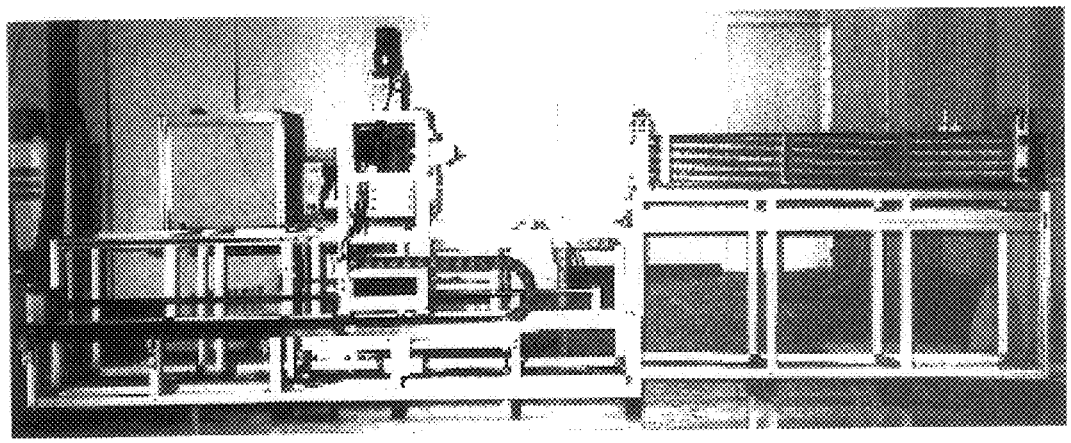
FIG. 4 is a photograph of the fuel rod extracting machine.
Figure 5:
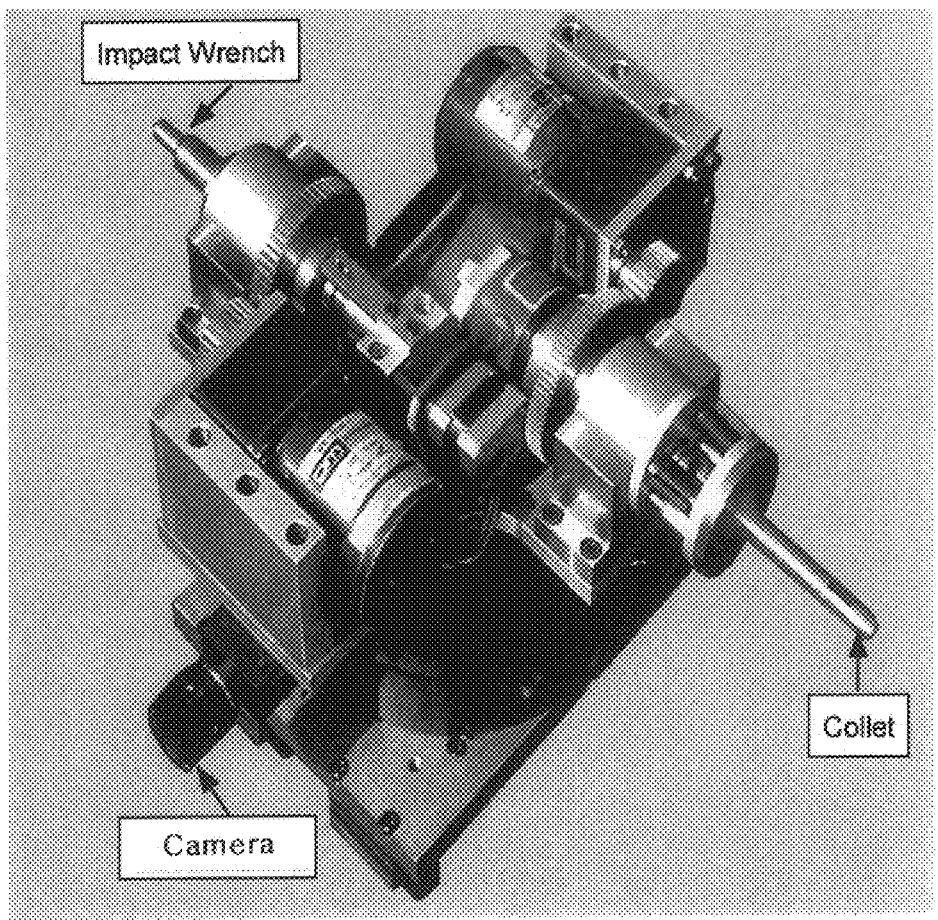
FIG. 5 is a photograph of the multi-functional rotary head.

FIGS. 4 and 5 are photographs of the actual fuel rod extracting machine and the multi-functional rotary head 30.

The operational sequence of the rod extraction using the multi-functional rotary head 30 is as follows:

(1) The camera 14 of the multi-functional tool part 3 is made to face toward the bottom end piece 12 of the fuel assembly 11.

(2) The image of the securing nut is taken by the camera 14, and all the positions of the securing nuts are calculated using the image processing algorithm and the calculated results are stored into a control computer of the fuel rod extracting machine.

(3) After storing the nut positions, the multi-functional tool part 3 is rotated clockwise by 90 degrees, so that the impact wrench 15 would face toward the bottom end piece 12.

(4) The multi-functional rotary head 30 is moved along the vertical and lateral axes in accordance with the memorized positions of the securing nut.

(5) The multi-functional rotary head 30 advances along the horizontal axis to insert the socket 17 onto the securing nut.

(6) The impact wrench 15 is driven to unfasten the securing nut.

(7) After unfastening, the nut discharging pin 18 advances to remove the securing nut from the socket 17.

(8) The multi-functional rotary head 30 retracts along the horizontal axis to prepare the unfastening the next securing nut. The procedure of steps 4 through 7 is repeated until all the securing nuts are removed.

(9) After the removal of all securing nuts, the bottom end piece 12 is removed by using a robot arm.

(10) In order to measure the position coordinates of the fuel rods, the multi-functional tool part 3 is rotated anti-clockwise by 90 degrees, so that the camera 14 would face toward the exposed fuel rods.

(11) The image of the fuel rods is taken by the camera 14, and the positions of all the fuel rods are calculated using an image processing algorithm, and then, the calculated results are stored into a control computer.

(12) After storing the positions of all fuel rods, the multi-functional tool part 3 is rotated anti-clockwise by 90 degrees, so that the gripper 16 would face toward the fuel rods.

(13) The multi-functional rotary head 30 is moved along the lateral and vertical axes in accordance with the memorized positions of the fuel rod, while opening the collet 21 of the gripper 16.

(14) The multi-functional rotary head 30 is moved along the horizontal axis until the collet 21 is inserted onto the fuel rod.

(15) The collet 21 is closed to grip the fuel rod, and then the multi-functional rotary head 30 retracts along the horizontal axis, thereby extracting the fuel rod.

(16) After completely separating the fuel rod from the fuel assembly, the collet 21 is opened so as to discharge the fuel rod into a conduit.

(17) The multi-functional rotary head 30 is moved along the horizontal, lateral and vertical axes to extract a next fuel rod. The procedure of the steps 13 through 16 is repeated until all the fuel rods are extracted.

In the step 14, if the fuel rod and the collet 21 are collided together due to misalignment of their centers, a collision signal is generated from a load cell 23. In this case, the program for abnormal condition is activated, and sends a retract command to the horizontal axis motor 7. After receiving the command, the horizontal axis motor 7 is activated and the multi-functional tool part 3 retracts. Consequently, the camera 14 is rotated so as to find the exact center position of the fuel rod. In this case the image of only one fuel rod is taken in order to get the more accurate position information by using an enlarged image information. After obtaining the position information, the gripper 16 of the multi-functional tool part 3 is rotated and moved according to the updated position of the fuel rod. Finally, the collet 21 is inserted again to extract the fuel rod.

In the above, the present invention was described based on the specific preferred embodiment and the attached drawings, but it should be apparent to those ordinarily skilled in the art that various changes and modifications can be added without departing from the spirit and scope of the present invention which will be defined in the appended claims.

According to the present invention as described above, there is developed a multi-functional rotary head which is capable of extracting the fuel rods one by one from the Korean type 17×17 LWR(Light Water Reactor) fuel assembly.

Compared with the conventional machines, the multi-functional rotary head according to the present invention has the following advantages.

That is, there are provided an impact wrench for unfastening the securing nuts, a gripper for gripping and extracting the fuel rods on a single rotary disc. Therefore, the working space within the hot cell can be drastically reduced.

Further, by utilizing the position data obtained by the camera, the reliability and accuracy in gripping process of the fuel rod can be improved.

Further, by introducing a remote compliance center, the gripping operation can be continued without the damage of the fuel rod even though there exists a small misalignment between the centers of the collet and the fuel rod.

Therefore, the reliability and safety are improved, and the extracting process can be fully automatized. Thus, eventually, the radiation exposure of the operators can be reduced.

What is claimed is:

1. A fuel rod extracting machine for extracting fuel rods from a spent nuclear fuel assembly, comprising:
    an assembly clamping table for securing a fuel assembly; and
    an extracting table for extracting the fuel rods; and
    said extracting table comprising:
        a multi-functional rotary head for carrying out securing nut removing operations, position measuring operations, and fuel rod gripping and extracting operations; and
        a servo mechanism for moving said multi-functional rotary head along horizontal, lateral and vertical axes.

2. A multi-functional rotary head of a fuel rod extracting machine for extracting fuel rods from a spent nuclear fuel assembly in combination with a head mounting plate, said multi-functional rotary head comprising a multi-functional tool part and a tool rotating part, said multi-functional rotary head being attached to a head mounting plate:
    said head mounting plate is movable along lateral and vertical axes by lateral and vertical axes servo mechanisms, respectively;

said each lateral and vertical axes servo mechanism comprises an LM guide, a ball screw, and a servo motor;

said multi-functional rotary head is mounted on said ball screw and said LM guide of said lateral axis servo mechanism which are attached to said head mounting plate;

said ball screw of said lateral axis servo mechanism is operatively linked to the axis of said lateral axis servo motor;

said LM guide of said lateral axis servo mechanism guides the lateral motion of said rotary head which is induced by rotational torque of a lateral axis servo motor;

said head mounting plate, on which said rotary head and said lateral axis servo mechanism are mounted, is attached to a vertical mount plate;

said vertical mount plate is vertically mounted on said ball screw and said LM guide of said vertical axis servo mechanism so that, by activating said vertical axis servo motor, said head mounting plate moves vertically;

a cradle supports said multi-functional rotary head, said head mounting plate, said vertical mount plate, and said vertical and lateral axes servo mechanisms;

a horizontal axis servo mechanism comprising a ball screw;

said cradle is mounted on said ball screw of said horizontal axis servo mechanism, and said ball screw being rotatable by a horizontal axis servo motor; and said multi-functional rotary head is moved to and from said fuel assembly by activating said horizontal axis servo motor.

3. The multi-functional rotary head as claimed in claim 2, wherein said multi-functional tool part comprises:

a camera for measuring the position of the fuel rods and securing nuts, said securing nuts fastened to a bottom end piece;

an impact wrench for unfastening said securing nuts; and a gripper for gripping and extracting said fuel rods one by one;

said camera of a fuel rod extracting machine for extracting fuel rods from a spent nuclear fuel assembly, said impact wrench, and said gripper are disposed on the circumference of a rotary disc at intervals of 90 degrees;

and said rotary disc is rotated by 90 degrees by driving the said tool rotating part.

4. The multi-functional rotary head of a fuel rod extracting machine for extracting fuel rods from a spent nuclear fuel assembly as claimed in claim 3, wherein said gripper comprises:

a collet for gripping a groove made on an end portion of the fuel rod;

a collet closing motor;

a reduction gear;

a load cell installed at the rear of said collet, for monitoring a state of insertion of said fuel rod onto said collet, and for measuring a fuel rod extracting force, so as to improve reliability and safety in using said multi-functional rotary head; and a remote compliance center installed at the rear of said collet, providing for a smooth insertion of the fuel rod onto the collet, even though there exists a small misalignment between them so that the fuel rod is not damaged by the pushing force of the collet.

5. The multi-functional rotary head of a fuel rod extracting machine for extracting fuel rods from a spent nuclear fuel assembly as claimed in claim 3, wherein said tool rotating part rotates said multi-functional tool part by 90 degrees to selectively make said camera, said impact wrench and said gripper of said multi-functional tool part face toward said fuel assembly; said tool rotating part comprising:

a rotating drive mechanism for rotating said multi-functional tool part; and an ascending drive mechanism for moving up and down said rotating drive mechanism;

wherein said rotating drive mechanism comprises: said rotary disc supporting said multi-functional tool part; an upper index ring attached on said rotary disc, and having gear teeth on the bottom thereof; four upper clutches attached on said rotary disc and disposed at intervals of 90 degrees; and a tool rotating motor and a reduction gear for rotating the rotary disc;

wherein said ascending drive mechanism comprises: a nut installed under the circumference of said rotary disc and linked to said rotary disc through a bearing; a screw for moving said nut up and down; a reduction gear for rotating said screw; four lower clutches disposed at intervals of 90 degrees, attached on a clutch mounting plate; a lower index ring attached on the clutch mounting plate, and having gear teeth on the top thereof; a tool ascending motor attached on said clutch mounting plate and rotates said reduction gear; and four sliding pins attached on the clutch mounting plate and being disposed at intervals of 90 degrees.

* * * * *